United States Patent
Park et al.

(10) Patent No.: US 12,194,415 B2
(45) Date of Patent: Jan. 14, 2025

(54) AQUEOUS TWO-PHASE SYSTEM NANOFILTER AND SEPARATION METHOD USING SAME

(71) Applicants: POSTECH ACADEMY-INDUSTRY FOUNDATION, Pohang-si (KR); EXOSOMEPLUS INC., Suwon-si (KR)

(72) Inventors: Jae Sung Park, Pohang-si (KR); Hyun Woo Shin, Busan (KR); Hwa Pyeong Jeong, Pohang-si (KR); Si Woo Cho, Suwon-si (KR)

(73) Assignees: POSTECH ACADEMY-INDUSTRY FOUNDATION, Pohang-si (KR); EXOSOMEPLUS INC., Suwon-si (KR)

( * ) Notice: Subject to any disclaimer, the term of this patent is extended or adjusted under 35 U.S.C. 154(b) by 798 days.

(21) Appl. No.: 17/316,864

(22) Filed: May 11, 2021

(65) Prior Publication Data
US 2021/0260528 A1     Aug. 26, 2021

Related U.S. Application Data

(63) Continuation of application No. PCT/KR2019/015304, filed on Nov. 12, 2019.

(30) Foreign Application Priority Data

Nov. 19, 2018  (KR) ..................... 10-2018-0142370

(51) Int. Cl.
*B01D 43/00*     (2006.01)
*B01D 61/02*     (2006.01)
(Continued)

(52) U.S. Cl.
CPC ............ *B01D 61/027* (2013.01); *B01D 43/00* (2013.01); *B01D 61/10* (2013.01); *B01D 61/12* (2013.01);
(Continued)

(58) Field of Classification Search
CPC ........ B01D 61/08; B01D 61/02; B01D 43/00; B01D 69/02; B01D 61/10; B01D 61/12
See application file for complete search history.

(56) References Cited

FOREIGN PATENT DOCUMENTS

| KR | 10-0194075 | 6/1999 |
|---|---|---|
| KR | 10-0863466 | 10/2008 |

(Continued)

OTHER PUBLICATIONS

Hamta, Afshin et al., "Application of polyethylene glycol based aqueous two-phase systems for extraction of heavy metals", Journal of Molecular Liquids 231 (2017) 20-24, Jan. 26, 2017.
(Continued)

*Primary Examiner* — Walter D. Griffin
*Assistant Examiner* — Cameron J Allen
(74) *Attorney, Agent, or Firm* — LEX IP MEISTER, PLLC

(57) ABSTRACT

Proposed are an aqueous two-phase system nanofilter capable of effectively separating particles having different sizes within a short time, and a separation method using same. The aqueous two-phase system nanofilter can separate mixed nanoparticles having a size difference of approximately 10 nm, through the designing of a composition constituting each composition. The separated nanoparticles can be applied across industries such as electronics, photoelectronics and magnetic fields, biomedical, medical and cosmetic fields, energy, catalysts, and structures.

13 Claims, 6 Drawing Sheets

(51) Int. Cl.
*B01D 61/10* (2006.01)
*B01D 61/12* (2006.01)
*B01D 69/02* (2006.01)
*C02F 1/44* (2023.01)

(52) U.S. Cl.
CPC .......... *B01D 69/02* (2013.01); *B01D 2311/02* (2013.01); *B01D 2311/10* (2013.01); *B01D 2313/903* (2022.08); *B01D 2325/0283* (2022.08); *C02F 1/442* (2013.01)

(56) References Cited

FOREIGN PATENT DOCUMENTS

| KR | 10-1575488 | 12/2015 | | |
|---|---|---|---|---|
| KR | 10-2016-0114336 | 10/2016 | | |
| KR | 10-1745455 | 6/2017 | | |
| KR | 10-1761680 | 8/2017 | | |
| WO | WO-2004018066 A2 * | 3/2004 | ....... | A61K 47/48776 |

OTHER PUBLICATIONS

Juan A.Asenjo et al., "Aqueous two-phase systems for protein separation: A perspective", Journal of Chromatography A, vol. 1218, Issue 49, pp. 8826-8835, Dec. 9, 2011.
Atefi, Ehsan et al., "Ultralow Interfacial Tensions of Aqueous Two-Phase Systems Measured Using Drop Shape", Langmuir, vol. 30, No. 32, pp. 9691-9699, Jul. 28, 2014.
KIPO, Office Action of Application No. 10-2018-0142370, Mar. 31, 2020.

* cited by examiner

AQUEOUS TWO-PHASE SYSTEM NANOFILTER AND SEPARATION METHOD USING SAME

CROSS-REFERENCE TO RELATED APPLICATIONS

This application claims priority to Korean Patent Application No. 10-2018-0142370, filed on Nov. 19, 2018, the disclosure of which is incorporated herein by reference in its entirety.

TECHNICAL FIELD

The present disclosure relates to an aqueous two-phase system nanofilter and a separation method using the same.

BACKGROUND ART

A nanoparticle refers to material whose a primary particle forming the nanoparticle has a diameter (maximum outer diameter) ranging from about 1 to 100 nm. A reduction in size of the nanoparticle realizes a surface-area increase effect and a capillary effect.

The surface-area increase effect of the nanoparticle has a great influence on a chemical reaction, a catalyst reaction, and the adsorption and desorption behavior of heterogeneous components, which are highly related to a surface phenomenon. In contrast, the capillary effect (pressure effect acting on the interior of powder under the effect of surface tension) changes the fundamental properties of the powder, thus causing new phenomena that are not known. Thus, the nanoparticle has properties that are not possessed by powder having the size of microns or submicrons, so that its application field is very wide.

There are various types of commonly known nanoparticles, for example, metal nanoparticles such as silver nanoparticles, inorganic nanoparticles, organic nanoparticles, organic-inorganic hybrid nanoparticles, bio-nanoparticles, and bio-derived nanoparticles.

Thus, various products to which the nanoparticles are applied are produced and applied to various industrial fields. For instance, new technology using the nanoparticles is actively being developed in various fields such as semiconductors, medicine, biology, electronic communication, food, or private supplies. The nanoparticles are being used in a large number of products, such as an LCD monitor, a mobile phone, a washing machine, various antibacterial products, or various types of cosmetics including sunscreens.

The nanoparticles are obtained through synthesis or from nature or living organisms. Here, the nanoparticles are present in a particle size of a predetermined range, so that the nanoparticles may be used as they are but may be usually used after the nanoparticles are separated.

A typical particle separation method employs a filtration method using a separation membrane. According to the type and method of the separation membrane, there are a microfiltration (MF) method, an ultrafiltration (UF) method, a nanofiltration (NF) method, and a reverse osmosis (RO) filtration method. The method using the separation membrane is a method of mainly separating solid from a liquid-solid system, and has a difficulty in separating the nanoparticles at high purity according to a size. Furthermore, in order to separate the nanoparticles, the separation membrane should have nano-sized pores. However, this is problematic in that the size of the pores formed in the separation membrane is not uniform, and the nanoparticles are aggregated in the pores during a separation process, so that the pores of the separation membrane may be clogged. In addition, as the content of the nanoparticles used for separation increases, a rate at which the pores are clogged increases, thus making it difficult to separate the nanoparticles.

Thus, a method of separating the nanoparticles using a difference in physical properties other than a particle size has been developed. Examples of the method include a method of using electrical properties of a surface, centrifugation using the density of particles, etc.

In the case of using the electrical properties of the surface of the nanoparticle, it is difficult to apply this method if the surfaces of particles that are to be separated have no charge or a difference in charges is not large. Further, the method of using the density of the particles is also commercialized. However, this method has limitations in its application in the case of separating particles with a small density difference, so that this method is restrictively used. The above-described conventional nanoparticle separation methods have common drawbacks in that they cause a loss of many nanoparticles.

Furthermore, in order to separate the nanoparticles using a centrifuge, the centrifuge should be rotated at very high speed, and a high-speed centrifuge is required. This method is a method that is mainly used in a bio field, and is problematic in that cost required for separating the nanoparticles is increased, a process for preparing a sample is complicated, and a processing time is very long.

Recently, a method of separating nanoparticles using aqueous two-phase systems in which two types of aqueous solutions are phase-separated has been proposed. This method is known as an aqueous biphasic systems (ABS), aqueous two-phase systems (ATPS), or aqueous two-phase extraction (ATPE) method.

The separation using the aqueous two-phase systems is intended to separate or refine biomolecules using two polymer aqueous solutions of polyethylene glycol (PEG)/dextran. This separation system is a method of using the surface properties of the biomolecules, and is restrictively used for only a high concentration of protein.

Documents of Related Art

Patent Document

Korean Patent No. 10-15754880000 (Dec. 1, 2015), "Micro Fluid Centrifuge For Separation of Particle"

Non-Patent Document

Hamta, Afshin et al., "Application of polyethylene glycol based aqueous two-phase systems for extraction of heavy metals". *Journal of Molecular Liquids.* (2017) 231: 20~24.

Juan A. Asenjo et al., Aqueous two-phase systems for protein separation: A perspective *Journal of Chromatography A*, Volume 1218, Issue 49, 9 Dec. 2011, Pages 8826-8835

DISCLOSURE

Technical Problem

Therefore, the present disclosure is intended to provide a separation system which focuses on designing the composition of aqueous two-phase systems rather than separating nanoparticles by the surface properties of biomaterial, so that it can be applied to separate all types of nanoparticles without being limited to biomaterial such as protein.

Thus, the present disclosure is intended to provide an aqueous two-phase system nanofilter capable of separating nanoparticles by adjusting tension at an interface where two phases of the aqueous two-phase systems are in contact with each other.

Furthermore, the present disclosure is intended to provide a method of separating nanoparticles using the aqueous two-phase system nanofilter.

Technical Solution

In order to accomplish the above objectives, the present disclosure provides an aqueous two-phase system nanofilter, including a first aqueous phase forming a dispersion phase, and a second aqueous phase phase-separated from the dispersion phase and forming continuous phase, so as to separate mixed nanoparticles having different sizes.

Here, tension ($\gamma$) of an interface at which the first aqueous phase and the second aqueous phase are phase-separated satisfies the following Equation 1:

$$2 \times 10^{-7} J/m^2 \leq \gamma \leq 50 \times 10^{-5} J/m^2 \quad \text{[Equation 1]}$$

The first aqueous phase may flow in the continuous phase in a bulk form by gravitational force or buoyancy. The mixed nanoparticles may be separated by moving the nanoparticles from the first aqueous phase to the second aqueous phase through diffusion.

A pore on the interface may be a critical particle size that allows the particle to pass therethrough, and may have a diameter ranging from 1 to 500 nm.

The mixed nanoparticles may be metal nanoparticles, inorganic nanoparticles, organic nanoparticles, organic-inorganic hybrid nanoparticles, polymer particles, bio nanoparticles, bio-derived nanoparticles, or mixed particles thereof.

Further, the present disclosure provides a nanoparticle separating method using an aqueous two-phase system nanofilter, the method including the following steps:
(S1) preparing a second aqueous phase and injecting it into a channel;
(S2) mixing a sample containing mixed nanoparticles with a first aqueous phase;
(S3) injecting a dispersion containing the sample into the channel in which the second aqueous phase is carried; and
(S4) performing a nanoparticle separation process from the sample.

Advantageous Effects

According to an embodiment of the present disclosure, an aqueous two-phase system nanofilter can separate mixed nanoparticles having a size difference of about 10 nm.

Particularly, the separation can be performed within a short period of time at low cost, and nanoparticles can be separated at high purity without damage and loss. Furthermore, in the case of applying external force such as temperature or ultrasonic waves, it is possible to further reduce time required for separation.

Such an aqueous two-phase system nanofilter can be applied to various industrial fields requiring nanoparticle separation without being limited to a bio field.

BEST MODE

The present disclosure proposes a nanofilter used to separate nano-materials having different sizes and a separation method using the nanofilter.

The nanofilter mentioned in the present disclosure means a device for separating nanoparticles from mixed nanoparticles having a nano-level particle size according to a particle size.

An aqueous two-phase system mentioned in the present disclosure means that aqueous solutions having different densities are phase-separated and present in a liquid-liquid state.

Thereby, the aqueous two-phase system nanofilter proposed in the present disclosure means a filter capable of separating nanoparticles through the escaping of the nanoparticles at the phase-separated interface (i.e., boundary surface), when two types of aqueous solutions are phase-separated.

A mechanism for separating particles using the aqueous two-phase system nanofilter will be described below.

Figure 1:
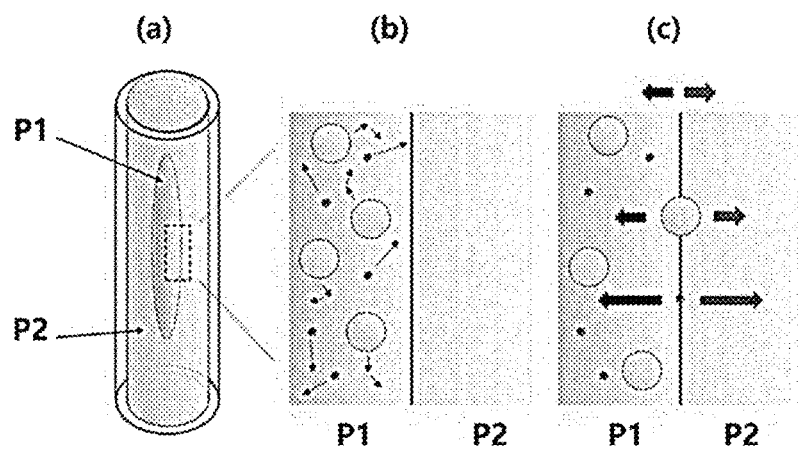
FIG. 1 is a schematic view illustrating a separation mechanism of an aqueous two-phase system nanofilter in accordance with the present disclosure.

FIG. 1 is a schematic view illustrating a separation mechanism of an aqueous two-phase system nanofilter in accordance with the present disclosure.

First, three types of nanoparticles that are to be separated are prepared. The three types of nanoparticles are merely for illustrative purposes. All nanoparticles in which two or more types having different particle sizes for separation are mixed are possible.

Next, two aqueous solutions for forming the aqueous two-phase system are prepared. In this regard, objects that are to be separated (mixed nanoparticles, samples) are included in either of a first aqueous phase P1 and a second aqueous phase P2. For the convenience of description, in FIG. 1, the objects are mixed in the first aqueous phase P1.

The aqueous two-phase system is formed as follows: two aqueous solutions are present, and these aqueous solutions are separated into the first aqueous phase P1 and the second aqueous phase P2 due to contact, as shown in FIG. 1A.

The first aqueous phase P1 is present in a floating state in the second aqueous phase P2 by gravitational force or buoyancy. When the first aqueous phase P1 has a density higher than that of the second aqueous phase P2, the first aqueous phase moves in a direction of the gravitational force, and is present while floating in the second aqueous phase P2 without settling to a bottom due to the buoyancy.

Particularly, the first aqueous phase P1 is present in the form of fine particles or droplets, and is present while floating in a bulk form rather than being separated into upper and lower layers as in an upper layer/a lower layer. The particle separation using a conventional aqueous two-phase system performs the separation of nanoparticles while the first aqueous phase is split into fine particles through a process such as vortexing, whereas the present disclosure performs the separation of nanoparticles in the bulk form. Furthermore, since the conventional aqueous two-phase system is changed in the energy barrier of the aqueous-solution boundary surface by the external force applied to the vortexing process and the particles may freely pass through the boundary surface by the external force, the separation effect by affinity between a particle surface and each aqueous phase is more prominent than particle filtering effect by the phase boundary surface.

Referring to FIG. 1B, the mixed nanoparticles present in the first aqueous phase P1 in the bulk state actively perform Brownian motion in which the nanoparticles move irregularly in the aqueous phase, and come into contact with the boundary surface between the first aqueous phase P1 and the second aqueous phase P2 through this motion.

In this case, the first aqueous phase P1 and the second aqueous phase P2 come into contact with each other to trap the nanoparticles by the boundary surface therebetween. By the diffusion coefficient of the trapped nanoparticles, the nanoparticles move to the second aqueous phase P2 or the first aqueous phase P1, or remain in the boundary surface. Consequently, as shown in FIG. 1C, some of the mixed nanoparticles of the first aqueous phase P1 move through the pores to the second aqueous phase P2. Thereby, after the elapse of a predetermined time, some of the mixed nanoparticles remain in the second aqueous phase P2, while the others remain in the first aqueous phase P1 or the boundary surface. Then, the second aqueous phase P2 including the boundary surface may be separated, and the nanoparticles present thereon may be collected, so that it is possible to separate the nanoparticles.

Particularly, since the first aqueous phase P1 continuously meets a new second aqueous phase P2 to form an interface while the first aqueous phase P1 is injected into the second aqueous phase P2 and then is moved downwards by gravitational force, the movement of the nanoparticles may be accelerated while occurring continuously in the boundary surface between the two phases P1 and P2. In the case where the phase is separated into the upper layer/the lower layer as one phase separation method, it is impossible to continuously form a new boundary surface, and thereby the continuous movement of the nanoparticles is impossible. Furthermore, when the phase is separated in the state of fine droplets, a new boundary surface may be formed by vortexing or the like. However, the energy barrier is changed at the boundary surface by the external force applied by the vortexing process, so that the particles may freely pass through the boundary surface by the external force, and thereby a great loss of particles may occur through the boundary surface in the vortexing process. Thus, this is not suitable. This method exhibits more prominent separation effect by affinity between a particle surface and each aqueous phase, compared to the filtering effect at the boundary surface, so that this method performs separation through a mechanism different from that of the present disclosure.

The separation of nanoparticles through the aqueous two-phase system nanofilter according to the present disclosure is affected by tension at the boundary surface of the aqueous solutions forming the first aqueous phase P1 and the second aqueous phase P2.

The interfacial tension means tension occurring in the boundary surface, when two or more different objects come into contact with each other while forming layers without being mixed with each other. The first aqueous phase P1 and the second aqueous phase P2 contain different solutes to have a difference in density, and tension is formed in the interface due to differences in size and physical properties of different solutes. The energy barrier over which the particle should climb is formed on the surface by the tension. This energy barrier serves as the pore. If the magnitude of the tension is large, the height of the energy barrier increases, so that the pore tends to be small. Thus, the pore having a size in the interface, i.e., a threshold diameter (or a limit diameter), is formed by the tension. Some of the mixed nanoparticles move through the pore, which is formed as such, to the first aqueous phase P1.

The threshold diameter is generally a nanometer level, and the nanometer level may be maintained only when the interfacial tension between the first aqueous phase P1 and the second aqueous phase P2 has a certain range. In other words, a small interfacial tension means that the first aqueous phase P1 and the second aqueous phase P2 are miscible with each other, so that it is impossible to separate particles. In contrast, when the interfacial tension is large, the phase separation may occur, but the threshold diameter is very small, so that it is impossible to separate particles. A relationship between the interfacial tension and the threshold diameter is a novel concept that is not proposed so far in the research field of the aqueous two-phase system.

The value of the interfacial tension set by the first aqueous phase P1 and the second aqueous phase P2 may be designed by the composition of the first aqueous phase P1 and the second aqueous phase P2. The design of the composition depends on whether the nanoparticles which are to be separated may diffuse beyond the energy barrier at the boundary surface formed by the contact of the first aqueous phase P1 and the second aqueous phase P2.

Figure 2:
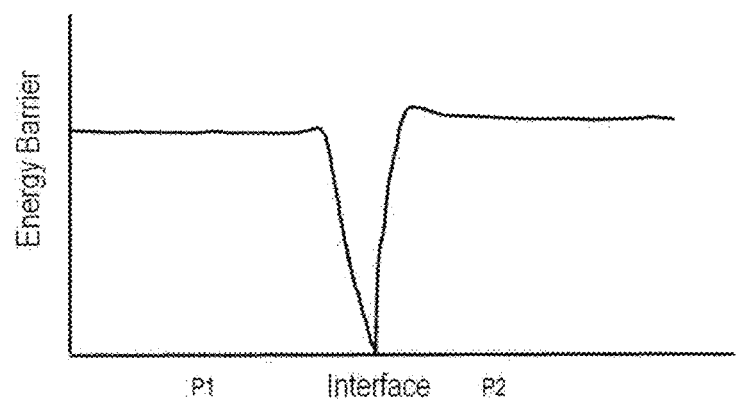
FIG. 2 is a schematic view illustrating energy barriers of a first aqueous phase and a second aqueous phase.

FIG. 2 is a schematic view illustrating the energy barriers of the first aqueous phase P1 and the second aqueous phase P2.

Referring to FIG. 2, the first aqueous phase P1 and the second aqueous phase P2 are aqueous solutions containing different solutes, and have the energy barriers of different heights. The mixed nanoparticles present in the first aqueous phase P1 jump over the energy barrier between the boundary surface and the second aqueous phase P1 to separate the particles, and then escape to the second aqueous phase P2. In the case of using the device of FIG. 1, some nanoparticles escaping to the second aqueous phase P2 do not move to the first aqueous phase P1 again. The passing of the energy barrier at the interface, i.e., the escaping energy from the first aqueous phase P1 is affected by the tension at the interface between the first aqueous phase P1 and the second aqueous phase P2.

As the surface tension of the boundary surface increases, the height of the energy barrier over which the particle present in the boundary surface should climb so as to escape to another phase increases, thus reducing the critical size of the particle that may escape from the boundary surface. This means that the interfacial tension of the boundary surface is used as a variable depending on how the first and second aqueous phases to be used are selected.

Furthermore, the movement and escape of the nanoparticles at the boundary surface from the first aqueous phase P1 to the second aqueous phase P2 are described through Fick's laws of diffusion. Fick's laws of diffusion are two laws showing a diffusion process in thermodynamics, and are composed of Fick's first law and Fick's second law. The present disclosure will be described by Fick's second law related to continuous diffusion.

The movement of the particle is predicted using Fick's second law and the escaping rate of the particle trapped by the boundary surface. The escaping rate of the particle trapped by the boundary surface satisfies Formula (1).

$$\Gamma \equiv \frac{J}{n} = ae^{-\Delta E/\kappa T} \quad \text{Formula (1)}$$

(In Formula (1), $\Gamma$: the rate of the particle escaping from the boundary surface, J: the flux of the particle, n is the concentration of the particle present in the boundary surface, $\alpha$: proportional constant, $\Delta E$: a difference in energy between the particle present in the boundary surface and the particle escaping from the boundary surface, $\kappa$: Boltzmann constant, T: temperature.)

The energy barrier $\Delta E$ of the particle present in the boundary surface between the first aqueous phase P1 and the second aqueous phase P2 may be expressed by the following Formula (2).

$$\Delta E = \frac{\pi R^2}{\gamma_{Phase1/Phase2}}(\gamma_{Phase1/Phase2} - \gamma_{Particle/Phase2} + \gamma_{Particle/Phase1})^2 = \frac{\pi R^2}{\gamma_{Phase1/Phase2}}\left(1 - \frac{\kappa T \ln K}{4\pi R^2 \gamma_{Phase1/Phase2}}\right)^2 \quad \text{Formula (2)}$$

(In Formula (2), $\gamma_{Phase/Phase2}$: tension acting on the boundary surface between the first aqueous phase and the second aqueous phase, R: the radius of the particle, $\gamma_{particle/Phase1}$: tension acting on the surface of the particle present in the first aqueous phase, $\gamma_{particle/Phase2}$: tension acting on the surface of the particle present in the second aqueous phase, $\kappa$: Boltzmann constant, T: absolute temperature, K: partition coefficient)

In the above Formula, $\Delta E$ means the energy barrier over which the particle present in the boundary surface should climb so as to escape from the boundary surface. The larger $\Delta E$ is, the lower the escaping rate of the particle is.

Furthermore, the movement of the particle near the boundary surface between the first aqueous phase P1 and the second aqueous phase P2 satisfies the following Formulas.

$$J_{Phase1\text{-}interface} = k_1 C_{Phase1} - \Gamma_{Phase1} C_{interface} \quad \text{Formula (3)}$$

$$J_{interface\text{-}Phase2} = \Gamma_{Phase2} C_{interface} - k_2 C_{Phase2} \quad \text{Formula (4)}$$

(In Formula (3) and (4), $J_{Phase1\text{-}interface}$: the movement of the particle between the first aqueous phase and the boundary surface, $J_{Interface\text{-}Phase2}$: the movement of the particle between the second aqueous phase and the boundary surface, $C_{Phase1}$: the concentration of the particle present in the first aqueous phase near the boundary surface, $C_{Phase2}$: the concentration of the particle present in the second aqueous phase near the boundary surface, $C_{Interface}$: the concentration of the particle present in the boundary surface, $\kappa 1$, $\kappa 2$: proportional constant, $\Gamma_{Phase1}$: the rate of the particle escaping from the boundary surface to the first aqueous phase, $\Gamma_{Phase2}$: the rate of the particle escaping from the boundary surface to the second aqueous phase)

In the above Formula, the movement of the particle between the second aqueous phase P2 and the boundary surface is the sum of the movement of the particle from the second aqueous phase P2 to the boundary surface and the movement of the particle escaping from the boundary surface to the second aqueous phase P2. Likewise, the movement of the particle between the first aqueous phase P1 and the boundary surface is the sum of the movement of the particle from the first aqueous phase P1 to the boundary surface and the movement of the particle escaping from the boundary surface to the first aqueous phase P1.

By applying the above Formula (1, 2, 3, and 4) to Fick's second law, a simulation is performed.

Three types of mixed bead particles of 10 nm, 50 nm and 100 nm are applied as the particle, and the amount of bead particles escaping to the second aqueous phase P2 is measured to determine coefficients of governed equation and a boundary condition. A dextran aqueous solution (1% concentration) is used as the first aqueous phase P1, and polyethylene glycol (3% concentration) is used as the second aqueous phase P2. Furthermore, since the first aqueous phase P1 continuously comes into contact with a new second aqueous phase P2 in the above Formula, it is assumed that the concentration of the particle present in the second aqueous phase P2 near the boundary surface approximates to zero (0) ($\cong C_{phase1} \cong 0$). Thus, the coefficients of the governed equation and the boundary condition are determined by measuring the amount of the bead particles escaping to the second aqueous phase P2. On the basis of the determined coefficients, the particle separation is simulated according to a particle size, filtering time, partition coefficients, temperature, and the surface tension of the boundary surface.

Figure 3:
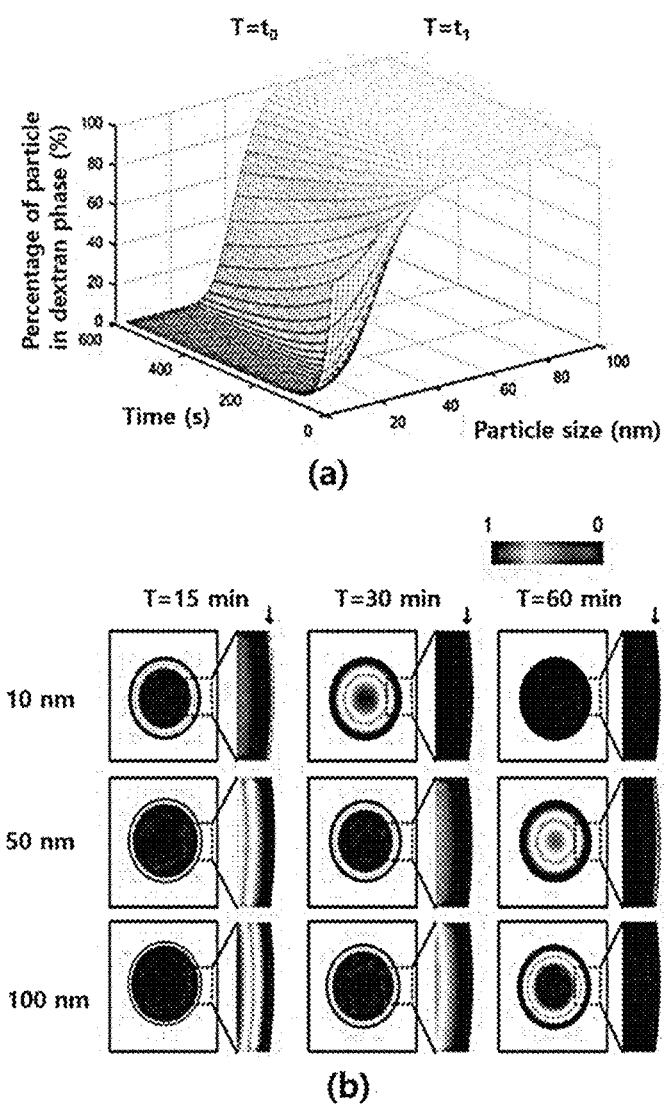
FIG. 3 is a simulation result showing a movement according to a particle size using three types of bead particles with different particle sizes.

FIG. 3 is a simulation result showing a movement according to a particle size using three types of bead particles with different particle sizes.

Referring to FIGS. 3A and 3B, the critical size of the bead particles passing through the boundary surface with time is gradually increased. Based on this fact, it can be seen that the bead particle of the small size first escapes to the second aqueous phase P2.

To be more specific, referring to FIG. 3A, the critical size of the bead particles that may pass through the boundary surface with time is sharply increased within 200 seconds, and then converges on a predetermined size. Furthermore, referring to FIG. 3B, it can be seen that all of the nanoparticles having the size of 10 nm pass through the interface after 60 minutes, and the nanoparticles having the size of 50 nm and 100 nm remain in the interface. This means that the aqueous two-phase system nanofilter serves as a filter that allows only the particle below a certain size to pass therethrough.

Particularly, it can be seen that the particle of 10 nm escapes completely after 60 minutes, so that nanoparticles may be separated from the mixed nanoparticles without a loss at high purity, i.e. at a yield that is at or close to 100%. Based on this result, when this is applied to a real nanoparticle separation process, it is possible to fundamentally solve the problem of the conventional separation membrane in which nanoparticles may be lost in the separation process. Thus, the separation process of the high purity can be advantageously achieved using the aqueous two-phase system nanofilter according to the present disclosure.

Figure 4:
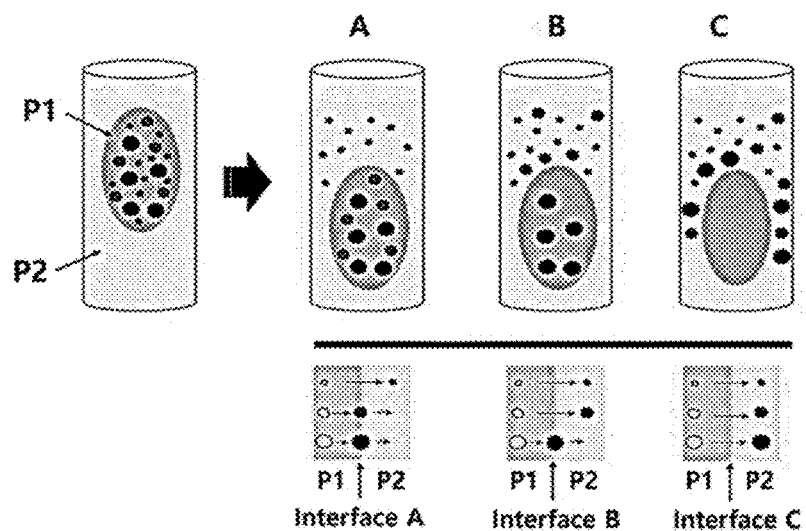
FIG. 4 is a schematic view showing a movement according to a particle size using three types of bead particles with different particle sizes.

This is shown in more detail in the schematic view of FIG. 4.

FIG. 4 is a schematic view showing a movement according to a particle size using three types of bead particles with different particle sizes.

As shown in FIG. 4, the particles move from the first aqueous phase P1 to the interface formed by the contact with the second aqueous phase P2. Some of the particles coming into contact with the boundary surface are trapped by the boundary surface. At this time, the particles escape from the first aqueous phase P1 to the second aqueous phase P2 according to a particle size.

FIG. 4 shows three types of interfaces. The interface A allows only the small-sized particles to pass therethrough, the interface B allows the small- and medium-sized particles to pass therethrough, and the interface C allows the particles of all sizes to pass therethrough. Thereby, it is possible to selectively separate the nanoparticles from the mixed nanoparticles according to a particle size.

In detail, when it is necessary to separate the smallest particle among three particles, the design of the interface A is applied, so that the small-sized particle may pass through the second aqueous phase P2 and then be collected. In this way, it is possible to separate the small-sized particles. Further, when it is necessary to separate the largest particle, the design of the interface B is applied, so that the largest particle remaining in the first aqueous phase P1 may be collected and separated. Furthermore, as for the medium-sized particle, the design of the interface B is applied to collect the second aqueous phase P2, and then the design of the interface A (not shown) is applied, so that a process of separating small- and medium-sized particles from the second aqueous phase P2 is performed once again. Thereby, only the medium-sized particle may be selectively collected.

As mentioned above, the passing of the nanoparticles at the interface A, the interface B, and the interface C depends on the energy barrier according to the composition forming each of the first aqueous phase P1 and the second aqueous phase P2, and tension (i.e., interfacial tension) at the interface formed by the contact of the first and second aqueous phases. If the energy barriers of the first aqueous phase P1 and the second aqueous phase P2 are low, the interfacial tension formed by the contact of the first and second aqueous phases is reduced. As the interfacial tension is reduced, the size of the particle passing through the interface (i.e., critical particle size) may be increased.

Figure 5:
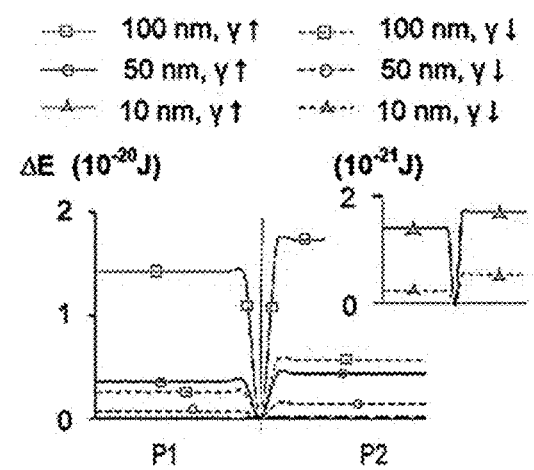
FIG. 5 is a schematic view showing a size of the energy barrier according to a particle size and interfacial tension between the first aqueous phase and the second aqueous phase.

FIG. 5 is a schematic view showing a size of the energy barrier between the first aqueous phase P1 and the second aqueous phase P2 according to the interfacial tension and the particle size.

In FIG. 5, the larger the interfacial tension of the first aqueous phase P1 and the second aqueous phase P2 is, the higher the energy barrier is. Here, there is a difference in barrier which energy each of the nanoparticles of 10 nm, 50 nm, and 100 nm should overcome, and the nanoparticle of 10 nm has the lowest energy barrier. In other words, as the size of the particle becomes smaller, the energy barrier which the particle should overcome when escaping from the boundary surface to a different phase becomes lower. If the particle exceeds a certain size, the energy barrier is too high, so that the particle does not overcome the energy barrier.

When the first aqueous phase P1 and the second aqueous phase P2 come into contact with each other to form the interface, the nanoparticle that has the size of 10 nm and is low in energy barrier first escapes to the second aqueous phase P2. Thus, in order to enable the passing of the nanoparticle having the size of 100 nm, the interfacial tension of the first aqueous phase P1 and the second aqueous phase P2 should be lowered. In proportion to the interfacial tension, the energy barrier is lowered, thus allowing the nanoparticle to escape to the second aqueous phase P2.

This result means that the critical particle size of the nanoparticle capable of passing through the boundary surface may be dominantly determined according to the interfacial tension. In other words, the lower interfacial tension means that the size of the nanoparticle passing through the boundary surface may be increased.

Figure 6:
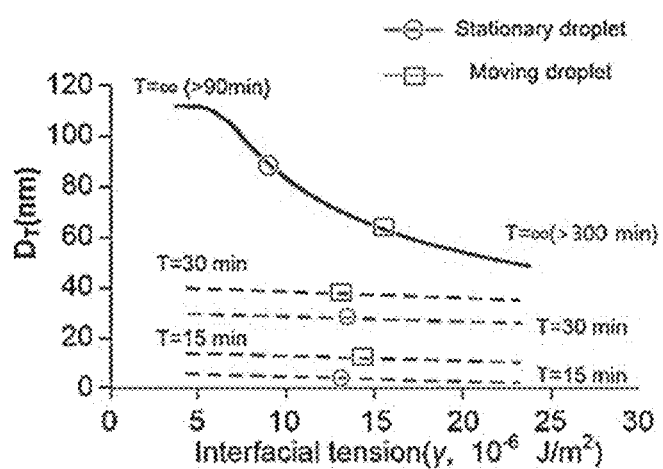
FIG. 6 is a graph showing a change in critical particle size as a function of interfacial tension by the first aqueous phase and the second aqueous phase.

FIG. 6 is a graph showing a change in critical particle size $D_t$ as a function of interfacial tension by the first aqueous phase P1 and the second aqueous phase P2.

Referring to FIG. 6, it can be seen that the critical size of particles escaping through the boundary surface varies depending on the interfacial tension.

To be more specific, it can be seen that the critical size of particles, which may escape through the interface, finally tends to be small as the interfacial tension increases. Further, it can be seen that the critical particle size changes with time before reaching a specific time, but the final critical particle size is the same. Furthermore, it can be seen that the critical particle size increases with time. By interpreting it, it is possible to check time spent on removing a desired size. By way of example, in the case of the aqueous two-phase system nanofilter designed to have the interfacial tension of $5\times10^{-6}$ J/m2, it is possible to separate the nanoparticles having the critical particle size of 40 nm within 30 minutes.

Through such a result, in order to separate the mixed nanoparticles having the nano-level particle size in the present disclosure, the first aqueous phase P1 and the second aqueous phase P2 should have the range of the interfacial tension ɣ satisfying the following Equation 1.

$$2\times10^{-7} J/m^2 \leq ɣ \leq 50\times10^{-5} J/m^2 \quad \text{[Equation 1]}$$

The pore size that may be implemented through the aqueous two-phase system nanofilter according to the present disclosure has the range of 1 to 500 nm, preferably 3 to 450 nm, more preferably 5 to 400 nm, much more preferably 5 to 350 nm, much more preferably 10 to 250 nm, and most preferably 30 to 180 nm. Here, the mixed nanoparticles may have at least 2 types.

The interfacial tension for separating the mixed nanoparticles of the above size has the range of $2\times10^{-7}$ J/m² to $50\times10^{-5}$ J/m², preferably $2\times10^{-7}$ J/m² to $40\times10^{-5}$ J/m², more preferably $3\times10^{-6}$ J/m² to $350\times10^{-6}$ J/m², more preferably $4\times10^{-6}$ J/m² to $270\times10^{-6}$ J/m², much more preferably $5\times10^{-6}$ J/m² to $150\times10^{-6}$ J/m², and most preferably $10\times10^{-6}$ J/m² to $60\times10^{-6}$ J/m².

Here, when the interfacial tension is not within the range proposed in Equation 1 but falls outside a predetermined limit, i.e. $2\times10^{-7}$ J/m², the phase separation does not occur, and the first aqueous phase P1 and the second aqueous phase P2 are mixed with each other, so that the aqueous two-phase system nanofilter is not formed. In contrast, when the interfacial tension exceeds a predetermined value, i.e., $50\times10^{-5}$ J/m², the nanoparticles do not escape. This is data that may prove that the nanoparticles may be separated through the escaping of the nanoparticles, as it is possible to form a stable aqueous two-phase system nanofilter only when it has a numerical range of the interfacial tension of Equation 1 proposed in the present disclosure.

Furthermore, referring to a separation time, it can be seen that the smaller the size of the nanoparticle is, the higher the interface escape speed is.

When the compositions of the first aqueous phase P1 and the second aqueous phase P2 are designed to have specific interfacial tension, as the critical particle size is changed depending on the interfacial tension as shown in FIG. 6, it is possible to predict that the nanoparticles may be easily separated at high purity.

Preferably, as the aqueous two-phase system nanofilter according to the present disclosure may adjust the interfacial tension by designing the composition and may control the critical particle size by adjusting the interfacial tension, it is possible to implement the filter having the critical particle size which has the range of 1 to 500 nm, 3 to 450 nm, more preferably 5 to 400 nm, more preferably 5 to 350 nm, much more preferably 10 to 250 nm, and most preferably 30 to 180 nm. Here, the aqueous two-phase system nanofilter has a separation capability to allow the particles having the difference of at most 10 nm to be separated. The separation capability of 10 nm means that it is possible to separate the nanoparticles having the difference of at most 10 nm, such as 10 nm or 20 nm. It is apparent that the separation of the nanoparticles having the difference of 90 nm, such as 10 nm or 100 nm may be performed.

Meanwhile, FIG. 6 separately shows a case where the first aqueous phase P1 is a stationary phase and a case where the first aqueous phase is a moving phase. When time is infinite, the first aqueous phase P1 shows the same result in both the stationary phase and the moving phase. However, it can be seen that it is advantageous for the separation of the nanoparticles when the first aqueous phase P1 has the moving phase within a fixed time. Generally, given that the nanoparticles are separated not in an infinite time but within a fixed time, it is preferable that the first aqueous phase P1 having the moving phase be applied to a real separation process.

Figure 7:
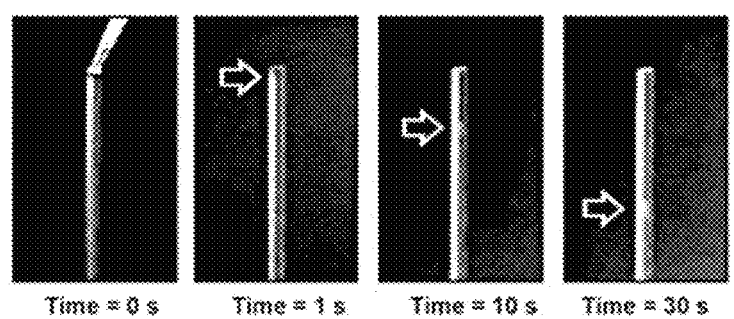
FIG. 7 is a photograph showing the movement of a fluorescent bead after the first aqueous phase is formed in the second aqueous phase in an embodiment.
Figure 8:
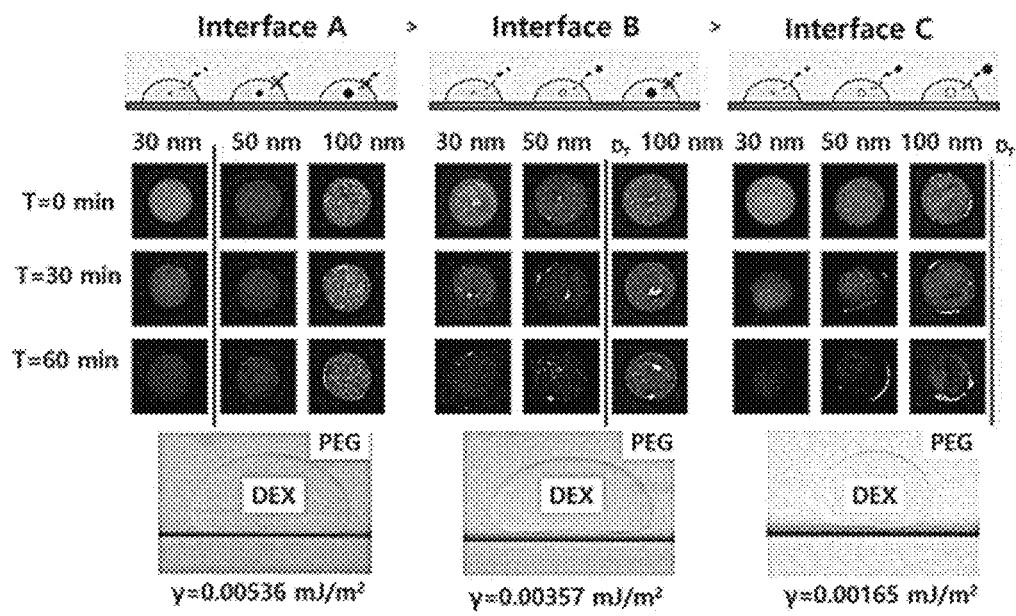
FIG. 8 is an image showing the moving degree of the fluorescent bead according to a time, and the lower part of FIG. 8 shows the interfacial tension of the first aqueous phase (DEX) and the second aqueous phase (PEG) of A, B, and C.

Through the simulation result as well as the theoretical consideration related to the above-described interfacial tension, energy barrier, and critical particle size, a direct experiment was performed as shown in FIGS. 7 and 8 to determine whether the nanoparticle separation of the present disclosure may be applied to a real process.

First, three types of fluorescent beads of 30 nm, 50 nm, and 100 nm were prepared as the mixed nanoparticles, the dextran aqueous solution was used as the first aqueous phase P1, and the polyethylene glycol (PEG) was used as the second aqueous phase P2. This experiment was performed under the conditions of partition coefficient (K)=100, temperature=20° C., time=300 s, and interfacial tension=0.013 mJ/m².

In this case, the aqueous two-phase system filter having the interfacial tension was designed as follows by adjusting the concentrations of the first aqueous phase P1 and the second aqueous phase P2.

TABLE 1

| Configuration | Interfacial tension (X10⁻⁶ J/m²) |
| --- | --- |
| A | 5.36 |
| B | 3.57 |
| C | 1.65 |
| D | 30 |
| E | 55 |

A total of nine test tubes were prepared, and three types of fluorescent beads having the size of 30 nm, 50 nm, and 100 nm were injected into filters of configurations A, B, and C, respectively, to check the movement of the fluorescent beads with a fluorescence microscope. Here, filters of configurations D and E have the critical particle size of 30 nm or less, so that there is no escape of the nanoparticles, and thus the filters are not shown in FIG. 8.

For the measurement, first, polyethylene glycol aqueous solution of 75 μL forming the second aqueous phase P2 was injected into the test tube (inner diameter of 2 mm). The fluorescent bead of 5 ng was added to the dextran aqueous solution of 3 μl, which is the first aqueous phase, to be uniformly mixed therewith. 3 μl of the obtained dispersion was slowly injected into the upper portion of the test tube containing the second aqueous phase P2 therein. It can be seen in FIG. 7 that the first aqueous phase P1 transfers to the lower portion of the test tube.

As soon as the first aqueous phase P1 and the second aqueous phase P2 are mixed (T=0 min), the movement of the fluorescent bead is measured through a fluorescent spectroscope after the elapse of 30 minutes and 60 minutes, and the result is shown in FIG. 8.

FIG. 8 is an image showing the moving degree of the fluorescent bead according to a time, and the lower part of FIG. 8 shows the interfacial tension of the first aqueous phase (DEX) and the second aqueous phase (PEG) of A, B, and C.

In composition A of FIG. 8, when the interfacial tension is $5.36 \times 10^{-6}$ J/m², only the nanoparticles of 30 nm among the nanoparticles of 30 nm, 50 nm, and 100 nm move to the second aqueous phase P2. Similarly, in composition B, it can be seen that the interfacial tension is $3.57 \times 10^{-6}$ J/m², the nanoparticles of 30 nm and 50 nm move to the second aqueous phase P2, and the nanoparticles of 100 nm remain in the first aqueous phase P1. Furthermore, in composition C, it can be seen that the interfacial tension is $1.65 \times 10^{-6}$ J/m², and all the nanoparticles of 30 nm, 50 nm, and 100 nm move to the second aqueous phase P2. Thereby, as represented by Equation 1, it can be seen that the interfacial tension should be at least $2 \times 10^{-6}$ J/m² or more.

From these results, it can be seen that it is possible to adjust the critical size of the passing particles when the nanoparticles are separated by controlling the interfacial tension.

The tension at the interface between the first aqueous phase P1 and the second aqueous phase P2 may be formed by designing the compositions of the first aqueous phase and the second aqueous phase.

In order to have the interfacial tension between the first aqueous phase P1 and the second aqueous phase P2, the phase separation should be preceded. The phase separation may be performed in various ways, but the present disclosure may perform the phase separation through a two phase diagram between the first aqueous phase P1 and the second aqueous phase P2. Furthermore, the separation speed and separation capability of the nanoparticles may be improved depending on whether the surface of the nanoparticle has affinity with either the first aqueous phase P1 or the second aqueous phase P2. In this regard, the specific compositions forming the first aqueous phase P1 and the second aqueous phase P2 may be selected through the two phase diagram to form the aqueous two-phase system nanofilter.

The first aqueous phase P1 and the second aqueous phase P2 are generally aqueous solutions in which a solute is dissolved in water.

Depending on the type of the solute, the first aqueous phase P1 and the second aqueous phase P2 may be a polymer aqueous solution or a salt aqueous solution, in which polymer and/or salt are present.

The polymer as the solute may be hydrophilic polymer.

Available hydrophilic polymer may be one type of hydrophilic polymer selected from a group consisting of polyarginine, polylysine, polyethylene glycol, polypropylene glycol, polyethyleneimine, chitosan, protamin, polyvinyl acetate, hyaluronic acid, chondroitin sulfate, heparin, alginate, hydroxyoxypropyl methylcellulose, gelatin, starch, poly(vinyl methyl ether ether), polyvinylpyrrolidone, and a combination thereof.

Furthermore, the polymer used as the solute may be polymer polysaccharide. The polymer polysaccharide may be one type of hydrophilic polymer selected from a group consisting of cyclodextrin, glucose, dextran, mannose, sucrose, trehalose, maltose, ficoll, inositol, mannitol, sorbitol, sucrose-mannitol, glucose-mannitol, trehalose-polyethylene glycol, sucrose-polyethylene glycol, sucrose-dextran, and a combination thereof.

The salt used in the salt aqueous solution may be one type of hydrophilic polymer selected from a group consisting of $(NH_4)_2SO_4$, $Na_2SO_4$, $MgSO_4$, $K_2HPO_4$, $KH_2PO_4$, NaCl, KCl, NaBr, NaI, LiCl, n-$Bu_4NBr$, n-$Pr_4NBr$, $Et_4NBr$, $Mg(OH)_2$, $Ca(OH)_2$, $Na_2CO_3$, $ZnCO_3$, $Ca_3(PO_4)_2$, $ZnCl_2$, $(C_2H_3)_2Zn$, $ZnCO_3$, $CdCl_2$, $HgCl_2$, $CoCl_2$, $(CaNO_3)_2$, $BaCl_2$, $MgCl_2$, $PbCl_2$, $AlCl_3$, $FeCl_2$, $FeCl_3$, $NiCl_2$, $AgCl$, $AuCl_3$, $CuCl_2$, sodium dodecyl sulfate, sodium tetradecyl sulfate, dodecyltrimethylammonium bromide, dodecyltrimethylammonium chloride, tetradecyltrimethylammonium bromide, and a combination thereof.

Furthermore, a polymer salt may be used as the solute. For example, a combination of the above-described polymer and salt may be used.

Depending on the properties of nanoparticles that are to be separated (e.g., surface properties), properties that enable phase separation, and concentration, the above-described polymer and salt may be appropriately selected as the first aqueous phase P1 and the second aqueous phase P2.

Among them, each of combinations that may be used as the first aqueous phase P1 and the second aqueous phase P2 may be a polymer having hydrophilic-hydrophobic properties. Since the polymer is basically dissolved in the aqueous solution, the polymer exhibits hydrophilicity. However, in the case of combining two compositions, it may have relatively hydrophilicity or may have relatively hydrophobicity. For example, in the case of dextran and polyethylene glycol, the dextran has relatively hydrophilicity and is denser in molecular structure, while the polyethylene glycol has relatively hydrophobicity and is less dense in molecular structure. Thus, the dextran/polyethylene glycol may be used as the first aqueous phase/second aqueous phase (P1/P2), respectively.

Furthermore, when each of combinations that may be used as the first aqueous phase P1 and the second aqueous phase P2 is the polymer, the molecular weight and concentration of the polymer are important.

As the molecular weight and concentration of the polymer increase, the first aqueous phase and the second aqueous phase are stably formed. Meanwhile, when the molecular weight of the polymer is too small, the first aqueous solution and the second aqueous solution may be easily mixed with each other.

It is not easy to restrict the range of the molecular weight of the polymer, because the polymer should be dissolved (or swollen) in the aqueous solution and the solubility of the polymer in water varies depending on the kind of the polymer. The above-described hydrophilic polymer has the weight average molecular weight of 200 to 2,000,000, preferably 500 to 1,000,000, and more preferably 1,000 to 500,000. For example, in the case of the polyethylene glycol combining with the dextran, it has the weight average molecular weight ranging from 200 to 60,000, and preferably 500 to 40,000. Furthermore, the dextran has the weight average molecular weight ranging from 15 to 1,000,000, and preferably 1,000 to 500,000.

Here, the concentration of the aqueous solution of the polymer or polymer salt may be 0.001 to 20 wt %, preferably 0.01 to 15 wt %, and more preferably 0.1 to 10 wt %, even though there is a difference in solubility in water depending on the kind of the polymer. If the concentration is too low, the polymer aqueous solutions of the first aqueous phase P1 and the second aqueous phase P2 exhibit fluidity similar to that of water, so that both of them are miscible and thereby it is difficult to form the aqueous two-phase system. In contrast, if the concentration is too high, it takes a long time to dissolve polymer, and tension is too high at the interface of the aqueous two-phase system, so that the critical particle size is reduced and thereby it is difficult to separate the nanoparticles.

In the case of using salt instead of polymer, a high concentration of salt is required to form the aqueous two-phase system. As described above, as the molecular weight of the polymer increases, the first aqueous phase P1 and the second aqueous phase P2 are stably formed. Since the salt is lower in molecular weight that the polymer, the aqueous two-phase system may be formed only at the high concentration. The high concentration salt is preferably in the range of 1 to 70 wt %, and more preferably 5 to 50 wt %.

When a low concentration of salt is added to the system that may already have the first aqueous phase and the second aqueous phase, the salt is dissociated into an ionic status in the aqueous solution to change the moving speed of the nanoparticles. Preferably, the salt has the average molecular weight of 10 to 1000 parts by weight.

To be more specific, in the aqueous two-phase system nanofilter according to the present disclosure, the combination of the first aqueous phase/second aqueous phase (P1/P2) may employ the combinations of polymer-polymer, polymer-polymer salt, and polymer-high concentration salt, as shown in the following Table 2.

TABLE 2

|  | First aqueous phase (P1, dispersion phase) | Second aqueous phase (P2, continuous phase) |
| --- | --- | --- |
| Polymer-polymer combination | 5% dextran | 5% polyethylene glycol (MW = 100,000) |
|  | 2% dextran | 5% polyvinylpyrrolidone (MW = 5,000) |
|  | 2% dextran | 2% polyvinyl alcohol (MW = 130,000) |
|  | 5% dextran | 5% ficoll (MW = 400) |
|  | 3% poly (vinyl methyl ether ether) (MW = 5,000) | 5% polyethylene glycol (MW = 35,000) |
| polymer-high concentration salt combination | 10% $(NH_4)_2SO_4$ | 20% polyethylene glycol (MW = 35, 000) |
|  | 10% $Na_2SO_4$ | 20% polyethylene glycol (MW = 35,000) |
|  | 10% $MgSO_4$ | 20% polyethylene glycol (MW = 35,000) |
|  | 10% $K_2HPO_4$ | 20% polyethylene glycol (MW = 35,000) |

TABLE 2-continued

| First aqueous phase (P1, dispersion phase) | Second aqueous phase (P2, continuous phase) |
|---|---|
| 10% KH$_2$PO$_4$ | 20% polyethylene glycol (MW = 35,000) |
| 10% Na$_2$CO$_3$ | 20% polyethylene glycol (MW = 35,000) |

The combination shown in Table 2 is an example, and any combination may be used as long as various combinations using the above-described composition satisfy the interfacial tension suggested in Equation 1.

In addition, the performance of the aqueous two-phase system nanofilter according to the present disclosure is affected by separation speed due to additional parameters. The additional parameter may be temperature.

In the aqueous two-phase system nanofilter, the temperature may increase the escaping rate of the nanoparticles at the boundary surface between the first aqueous phase P1 and the second aqueous phase P2, thus increasing the escaping rate of the nanoparticles within the same time.

Figure 9:
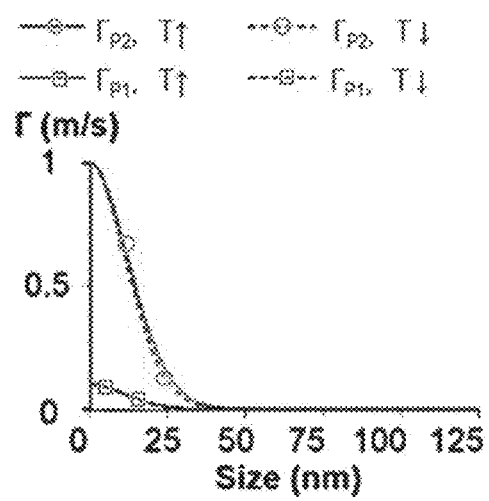
FIG. 9 is a graph showing a change in escaping rate at an interface as a function of the size of nanoparticles.

FIG. 9 is a graph showing a change in escaping rate interface as a function of the size of nanoparticles. In FIG. 9, $\Gamma_{P1}$ means the rate of the particle escaping from the boundary surface to the first aqueous phase, and $\Gamma_{P2}$ means the rate of the particle escaping from the boundary surface to the second aqueous phase.

Referring to FIG. 9, as the temperature increases, the Brownian motion of the nanoparticles accelerates and the escaping rate of the nanoparticles present on the boundary surface increases. From this result, it can be seen that the temperature may be used as the variable of process conditions that may be usefully employed when it is necessary to perform the separation within a short time with a very accurate size.

Figure 10:
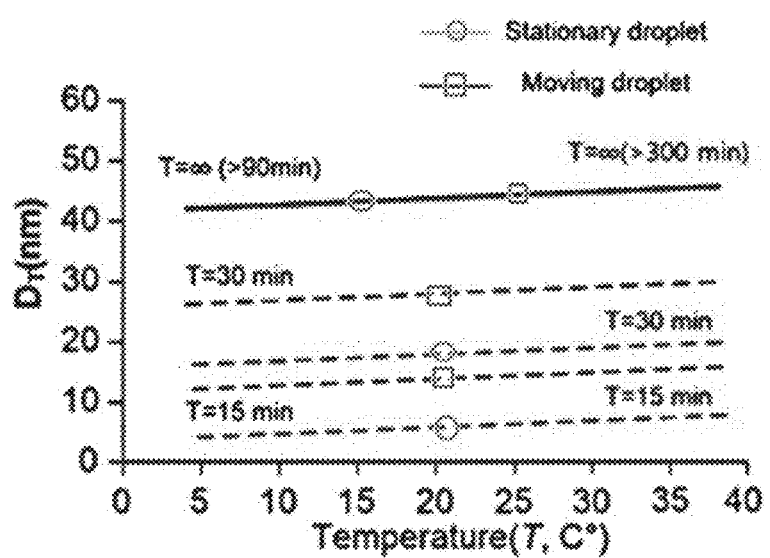
FIG. 10 is a graph showing a change in critical particle size according to a change in temperature.

FIG. 10 is a graph showing a change in critical particle size according to a change in temperature.

Referring to FIG. 10, it can be seen that the critical particle size tends to increase linearly as the temperature increases. However, the critical particle size shows a difference of 10 nm or less. Thus, even if the temperature increases when the nanoparticles are separated, only the separation speed increases and the critical particle size is not increased to be larger than necessary, so that it is possible to separate the nanoparticles at high purity.

Furthermore, when the first aqueous phase P1 is the stationary phase and the moving phase, only the separation speed is changed and the critical particle size finally becomes the same.

Furthermore, the parameter related to the separation capability of the aqueous two-phase system nanofilter includes vibration application as well as the temperature.

The vibration application may be ultrasonic-wave application. This causes external physical force to lower the energy barrier of the boundary surface, thus changing the critical particle size or helping the diffusion of the particles, and thereby increasing the escaping rate of the nanoparticles.

The mixed nanoparticles having different particle sizes have differences in mechanical properties such as differences in their sizes. When the nanoparticles are different from each other in material or composition as well as the size, the mechanical properties as material, density, and compression rate are significantly different. Here, when ultrasonic waves are applied to the mixed nanoparticles, the nanoparticles have different acoustic radiation forces depending on the particle size, so that the nanoparticles move along the sound pressure node line of the ultrasonic waves. In other words, when the nanoparticles are mixed, they may be separated and their moving speed may be increased. Particularly, it is possible to increase the escape of the nanoparticles trapped in the boundary surface between the first aqueous phase P1 and the second aqueous phase P2, so that it is possible to prevent the separation speed from being reduced due to the trapped nanoparticles.

The acoustic radiation force may be adjusted by controlling a frequency. In the present disclosure, this is preferably performed for 1 minute to 240 minutes at the intensity of 200 W to 400 W of 0.01 to 100 kHz. Here, if the intensity of the applied ultrasonic waves is too high, it affects the first aqueous phase P1 which should form a bulk, so that the first aqueous phase P1 may form fine droplets. Thus, this is appropriately performed within the above range. Furthermore, the ultrasonic waves may be applied through an ultrasonic generator.

Meanwhile, the aqueous two-phase system nanofilter according to the present disclosure includes a channel extending in one direction and having a hollow portion that is opened at an end thereof. The channel is mounted in a filter housing.

In this case, the channel is a passage or conduit through which the injected fluid may exist. The channel may be expressed for convenience, but includes not only a fine tube but also a column having a large inner diameter. In detail, the column may be used to separate a large amount of samples, and the channel may be used to separate a small amount of samples. Here, the channel may be a micro channel or a nano channel to facilitate the separation of the mixed nanoparticles.

The shape of the cross-section (perpendicular to a fluid flow direction) of the channel may be selectively changed according to manufacturing convenience or the purpose of a person skilled in the art, but is not limited thereto. The cross-section includes the shape of a circle, an ellipse, a rectangle, or a square, for instance. Preferably, the cross-section of the channel according to the present disclosure may have a circular shape.

Since resistance through the channel is in proportion to its length and is in inverse proportion to its cross-sectional area, the length, width, and height may be appropriately designed. Particularly, in order to flow in a bulk phase in the first aqueous phase P1, a sufficient length and width may be secured.

The channel may have a length of 0.01 to 3 cm, preferably 1 to 5 cm, may have a height (with respect to the cross-section of the conduit) of 0.001 to 5 cm, preferably 0.01 to 1 cm, and may have a width of 0.001 to 5 cm, preferably 0.01 to 1 cm.

The filter housing is a casing made of metal or synthetic resin, and has on an upper end or a lower end thereof a cover that may be opened or closed to allow the aqueous two-phase system nanofilter to be mounted therein. The filter housing has an inlet through which fluid may flow into the channel of the filter housing, and an outlet through which fluid may be discharged.

The aqueous two-phase system nanofilter may be formed by injecting the first aqueous phase P1 and the second aqueous phase P2 into the channel, and the channel may be disposed to be perpendicular to the ground to allow the first aqueous phase P1 to flow by gravitational force and buoyancy.

The filter housing may be equipped with a temperature control device as necessary, and may be connected to the ultrasonic generator.

Meanwhile, the above-described aqueous two-phase system nanofilter may be preferably applied to a nano-sized particle separation process.

To be more specific, the aqueous two-phase system nanofilter is used for a nanoparticle separating method including the following steps.

(S1) mixing a sample containing mixed nanoparticles with a first aqueous phase P1;

(S2) preparing a second aqueous phase P2 and injecting it into a channel;

(S3) injecting containing the sample into the channel in which the second aqueous phase P2 is carried; and (S4) performing a nanoparticle separation process from the sample.

Hereinafter, each of the steps will be described in detail.

First, before making the aqueous two-phase system nanofilter, the compositions of the first aqueous phase P1 and the second aqueous phase P2 are designed and prepared. The first aqueous phase P1 and the second aqueous phase P2 may be selected as a proper combination as described above.

In step (S1), the sample containing the mixed nanoparticles is mixed with the first aqueous phase P1 to prepare the dispersion.

The sample is mixed nanoparticles, and may vary depending on the application field of the aqueous two-phase system nanofilter. For example, this may be nanoparticles used throughout various industries such as electronics, photoelectronics, magnetic fields, biomedical, medical, cosmetic fields, energy, catalysts, structures, etc. Furthermore, the sample may be metal nanoparticles, inorganic nanoparticles, organic nanoparticles, organic-inorganic hybrid nanoparticles, polymer particles, bio nanoparticles, bio-derived nanoparticles, or mixed particles thereof, depending on the material.

Next, in step (S2), the second aqueous phase P2 is prepared and injected into the channel.

Next, in step (S3), the dispersion containing the sample is injected into the channel in which the second aqueous phase P2 is carried.

Next, in step (S4), this is left alone for a certain period of time to perform the nanoparticle separation process from the sample.

At this time, in order to increase the separation capability and separation speed of nanoparticles, one or more of the temperature control device and the ultrasonic generator may be operated.

The above-described steps may be performed to separate mixed nanoparticles having the size difference of about 10 nm. Particularly, the separation can be achieved at high purity within a short time, and the separation time can be further shortened when external forces such as temperature and ultrasonic waves are applied.

Although specific embodiments of the present disclosure have been disclosed in detail as described above, it is obvious to those skilled in the art that such description is merely of preferable exemplary embodiments and various modifications and variants may be made. However, these modifications should be construed as falling within the technical protection scope of the present disclosure. Therefore, the true technical protection scope of the present disclosure should be determined by the technical spirit of the appended claims.

The invention claimed is:

1. An aqueous two-phase system nanofilter, comprising:
a first aqueous phase forming a dispersion phase, and a second aqueous phase phase-separated from the dispersion phase and forming a continuous phase, so as to separate mixed nanoparticles having different sizes,
wherein the first aqueous phase flows in the continuous phase in a bulk form, and
wherein tension ($\gamma$) of an interface at which the first aqueous phase and the second aqueous phase are phase-separated satisfies the following Equation 1:

$$2\times10^{-7} J/m^2 \leq \gamma \leq 50\times10^{-5} J/m^2. \quad \text{[Equation 1]}$$

2. The aqueous two-phase system nanofilter of claim 1, wherein the aqueous two-phase system nanofilter separates the nanoparticles by moving the nanoparticles from the first aqueous phase to the second aqueous phase through diffusion.

3. The aqueous two-phase system nanofilter of claim 1, wherein a pore size of a filter formed on the interface ranges from 1 to 500 nm.

4. The aqueous two-phase system nanofilter of claim 1, wherein a pore size of a filter formed on the interface ranges from 30 to 80 nm.

5. The aqueous two-phase system nanofilter of claim 1, wherein the first aqueous phase and the second aqueous phase are any one selected from a polymer, a polymer salt, or an aqueous solution in which a salt is dissolved.

6. The aqueous two-phase system nanofilter of claim 5, wherein the polymer is one or more types selected from a group consisting of:
one type of hydrophilic polymer selected from a group consisting of polyarginine, polylysine, polyethylene glycol, polypropylene glycol, polyethyleneimine, chitosan, protamin, polyvinyl acetate, hyaluronic acid, chondroitin sulfate, heparin, alginate, hydroxyoxypropyl methylcellulose, gelatin, starch, poly(vinyl methyl ether), polyvinylpyrrolidone, and a combination thereof;
one type of polymer polysaccharide selected from a group consisting of cyclodextrin, glucose, dextran, mannose, sucrose, trehalose, maltose, ficoll, inositol, mannitol, sorbitol, sucrose-mannitol, glucose-mannitol, trehalose-polyethylene glycol, sucrose-polyethylene glycol, sucrose-dextran, and a combination thereof; and
a combination thereof.

7. The aqueous two-phase system nanofilter of claim 5, wherein the salt is one type selected from a group consisting of $(NH_4)_2SO_4$, $Na_2SO_4$, $MgSO_4$, $K_2HPO_4$, $KH_2PO_4$, NaCl, KCl, NaBr, NaI, LiCl, n-$Bu_4NBr$, n-$Pr_4NBr$, $Et_4NBr$, $Mg(OH)_2$, $Ca(OH)_2$, $Na_2CO_3$, $ZnCO_3$, $Ca_3(PO_4)_2$, $ZnCl_2$, $(C_2H_3)_2Zn$, $CdCl_2$, $HgCl_2$, $CoCl_2$, $(CaNO_3)_2$, $BaCl_2$, $MgCl_2$, $PbCl_2$, $AlCl_3$, $FeCl_2$, $FeCl_3$, $NiCl_2$, AgCl, $AuCl_3$, $CuCl_2$, sodium dodecyl sulfate, sodium tetradecyl sulfate, dodecyltrimethylammonium bromide, dodecyltrimethylammonium chloride, tetradecyltrimethylammonium bromide, and a combination thereof.

8. The aqueous two-phase system nanofilter of claim 1, wherein the first aqueous phase-the second aqueous phase are a combination of polymer-polymer, polymer-polymer salt, or polymer-high concentration salt.

9. The aqueous two-phase system nanofilter of claim 8, wherein the polymer is one or more types selected from a group consisting of:
one type of hydrophilic polymer selected from a group consisting of polyarginine, polylysine, polyethylene glycol, polypropylene glycol, polyethyleneimine, chitosan, protamin, polyvinyl acetate, hyaluronic acid, chondroitin sulfate, heparin, alginate, hydroxyoxypropyl methylcellulose, gelatin, starch, poly(vinyl methyl ether), polyvinylpyrrolidone, and a combination thereof;

one type of polymer polysaccharide selected from a group consisting of cyclodextrin, glucose, dextran, mannose, sucrose, trehalose, maltose, ficoll, inositol, mannitol, sorbitol, sucrose-mannitol, glucose-mannitol, trehalose-polyethylene glycol, sucrose-polyethylene glycol, sucrose-dextran, and a combination thereof; and a combination thereof.

10. The aqueous two-phase system nanofilter of claim 8, wherein the salt is one type selected from a group consisting of $(NH_4)_2SO_4$, $Na_2SO_4$, $MgSO_4$, $K_2HPO_4$, $KH_2PO_4$, NaCl, KCl, NaBr, NaI, LiCl, n-$Bu_4$NBr, n-$Pr_4$NBr, $Et_4$NBr, $Mg(OH)_2$, $Ca(OH)_2$, $Na_2CO_3$, $ZnCO_3$, $Ca_3(PO_4)_2$, $ZnCl_2$, $(C_2H_3)_2Zn$, $CdCl_2$, $HgCl_2$, $CoCl_2$, $(CaNO_3)_2$, $BaCl_2$, $MgCl_2$, $PbCl_2$, $AlCl_3$, $FeCl_2$, $FeCl_3$, $NiCl_2$, AgCl, $AuCl_3$, $CuCl_2$, sodium dodecyl sulfate, sodium tetradecyl sulfate, dodecyltrimethylammonium bromide, dodecyltrimethylammonium chloride, tetradecyltrimethylammonium bromide, and a combination thereof.

11. The aqueous two-phase system nanofilter of claim 1, wherein each of the first aqueous phase and the second aqueous phase has a concentration of 0.001 to 20 wt %.

12. The aqueous two-phase system nanofilter of claim 1, wherein the aqueous two-phase system nanofilter comprises a channel extending in one direction and having a hollow portion that is opened at an end thereof, and the channel has a body that is mounted in a filter housing to extend in a first direction.

13. The aqueous two-phase system nanofilter of claim 1, wherein the aqueous two-phase system nanofilter further comprises at least one of a temperature controller or an ultrasonic generator.

* * * * *